Aug. 17, 1954 W. R. MATHEWS 2,686,896
POWER BOOST CONTROL SYSTEM
Filed June 9, 1950
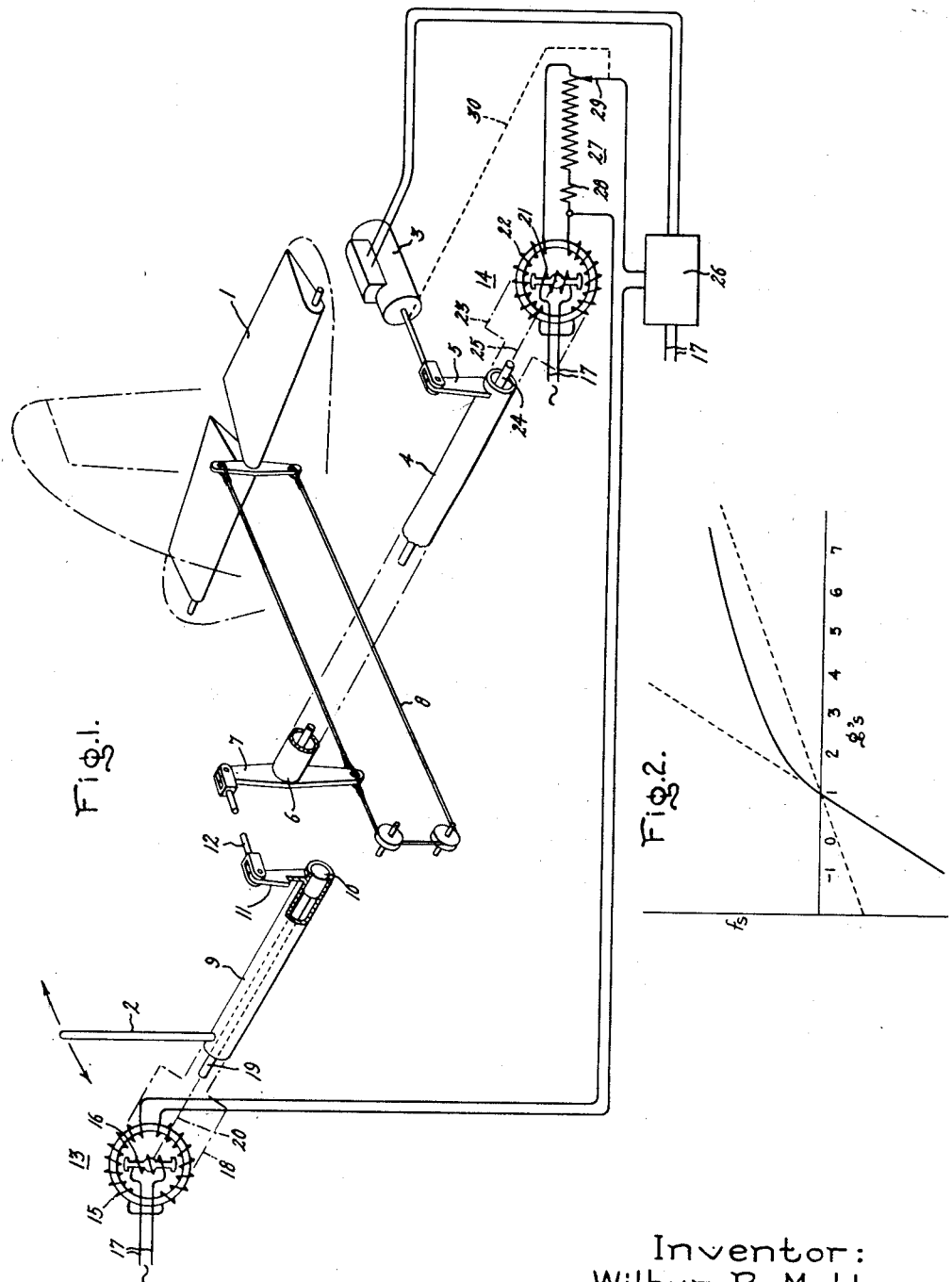
Inventor:
Wilbur R. Mathews,
by Claude␣␣␣␣␣
His Attorney.

Patented Aug. 17, 1954

2,686,896

UNITED STATES PATENT OFFICE 2,686,896

POWER BOOST CONTROL SYSTEM

Wilbur R. Mathews, Fort Worth, Tex., assignor to General Electric Company, a corporation of New York Application June 9, 1950, Serial No. 167,106

11 Claims. (Cl. 318—489)

The present invention relates to control systems and more particularly to control systems of the type wherein a controlled object is positioned by a control device with force amplification. It is especially useful in connection with power boost for aircraft and it is this application of my invention which I have elected to illustrate and discuss.

This invention represents an improvement over the system described in Webb Patent 2,451,263 which is also owned by the instant assignee.

Patent 2,451,263 describes a boost system wherein force for the positioning of an aircraft control surface is supplied by both a pilot's control lever and a servomotor acting on a common control shaft comprising a torque tube which is deformable. One signal generator, which may be of the selsyn type, is used to measure the strain in the part of the system carrying pilot forces and a second signal generator is used to measure the strain in the power aid or control surface portion of the system. The amplified difference between the two generated voltages, produced as a result of the torque, controls the servomotor and thus the resultant torque appearing at the control surface is the sum of the pilot effort and the servo effort. The ratio of the pilot force to the net force to hold a given control surface position, or the boost ratio is determined by the ratio of the pilot and load generator voltage gradients fed into the amplifier, and thus by means of a potentiometer, boost ratio may be varied by the pilot to operate the controls with extreme ease at large deflection angles. This has the disadvantage that if the boost ratio setting is made to provide sufficient ease of operation of the controls at large deflection angles, the airplane becomes unmanageable at small control deflection angles due to excessively high boost ratio and the resulting over control about the control neutral point.

The Webb patent further discloses the torque tube as a continuous assembly. This has the disadvantage of lack of flexibility inasmuch as the load strain member is not located at the most judicious point in keeping with the desirability of the shortest distance between the load to be controlled and the servo force which actuates the controlled object.

It is therefore an object of the present invention to provide an improved power boost system which is not subject to over-controlling at any control surface deflection.

Another object is to provide an electrically-controlled power boost system wherein the amount of boost produced is controlled in accordance with a predetermined flight condition.

A further object is to provide a boost control system having separate deformable members which measure the input torque and the servo torque rather than the input torque and the net output torque.

A still further object of the invention is to provide a power boost system having physically separated pilot force sensing and load force sensing units without sacrificing mechanical standby features of a manually operated system.

The invention will be more fully understood by referring now to the accompanying drawing wherein:

Fig. 1 is a schematic representation of an improved power boost system embodying my invention, the system being arranged to operate the elevator controls of an aircraft, and Fig. 2 is an explanatory curve.

According to my invention, I have provided a power boost system having two deformable members, the flexure of which produces two voltages corresponding to a measure of input torque and servo torque. Any difference in these voltages causes the servo to respond and thus assist the input control force, and the amount of assistance, or force amplification, depends upon the relative proportion of the signal voltages. One novel feature of my invention lies in the non-linear variation of the boost ratio as a function of load actuation for the purpose of providing improved sensitivity of control at predetermined levels of operation.

Referring now to Fig. 1, my invention is shown as embodied in a power boost system for operating the elevators 1 of an aircraft. Force for the positioning of the elevators 1 during flight is supplied by both a pilot lever 2 and a servomotor 3. The servomotor 3 is coupled to the elevator 1 by means of a torque tube 4 the outer end of which carries an upright bell-crank 5 connected to be operated by the servomotor 3. The inner end of the torque tube 4 is secured to a central solid hub member 6 in any suitable manner as by welding or brazing. The hub 6 has a double ended torque arm 7 projecting therefrom the lower end of which is connected to a cable 8 which operates the elevators. The hub 6 is free to rotate with respect to the aircraft structure and may be mounted in a suitable bearing (not shown).

The pilot control lever 2 is fastened to the outer end of a separate torque tube 9, the inner end of which is attached to a central hub member 10 in any suitable manner, as by welding or brazing. The hub 10 which is also free to rotate like hub 8, has a torque arm 11 projecting therefrom and the upper end of torque arm 7 is joined to torque arm 11 in any suitable manner such as by a turn buckle rod 12 for example. The connecting member 12 is shown as partly broken away to indicate that the torque tubes may be widely separated so as to be most advantageously located in an aircraft and although the axes of the torque tube are not coincident it will be seen that the torque arm 7 and torque arm 11 will rotate in synchronism. When the pilot lever 2 is moved to the left, the lower end of the bellcrank 7 pivots counterclockwise causing the elevators to be deflected in a downward direction, and when the pilot lever is moved to the right, the reverse action takes place, this controlling action being entirely conventional and operative even in the absence of a boost system thus providing mechanical standby.

The servomotor 3 is controlled in such a manner that it amplifies the force supplied to the pilot lever 2 so that the pilot need only supply a fractional part of the total force required to operate the elevators 1. In general, this is accomplished by the provision of reversible polarity electric signal generators 13 and 14 which are connected to be actuated in accordance with the elastic deformation occurring in the torque tubes 9 and 4. The signal generators 13 and 14 are connected so that their differential output may be employed to control the direction of movement of the servomotor 3.

The electric signal generator 13 may be a conventional selsyn illustrated schematically as comprising the rotor winding 15 and the stator winding 16. The winding 16 is connected to alternating current supply leads 17. When the rotor winding 15 is in the neutral position shown, the alternating current voltage induced therein from winding 16 is zero. When the rotor 15 is rotated in either direction from the neutral position shown, relative to the stator winding 16, the former produces a net voltage, the magnitude of which varies in accordance with the amount of displacement and the polarity or direction of which varies in accordance with the direction of the displacement from neutral.

In order that the stator and rotor of the signal generator 13 may be relatively displaced in accordance with the elastic deformation occurring in the torque tube 9, the rotor 15 is mechanically connected to the outer end of the torque tube in any suitable manner, this connection being schematically indicated by the dash line 18. The stator 16 of the signal generator 13 is maintained at a reference or datum position by connecting it to an outer end of a rod 19, this connection being schematically indicated by the dash line 20. As will be noted from an inspection of the drawing, the rod 19 is located within the hollow torque tube 9, the inner end of the rod being attached to or forming part of the central hub member 10. Thus, whenever force is transmitted between the pilot control lever 2 and the elevators 1 through the linkage including the torque tube 9, the elastic deformation or twist of the torque tube will cause a corresponding rotation between the rotor and stator of the signal generator 13 and the voltage output of the signal generator will indicate by its magnitude and polarity the amount and direction of the elastic deformation of the torque tube 9.

The electric signal generator 14 is similar to the previously described signal generator 13 and has a stator winding 21 and a rotor winding 22. The stator winding 21 is connected to the common alternating current supply leads 17.

In order that the electric signal generator 14 may be actuated in accordance with the elastic deformation occurring in the torque tube 4, the rotor 22 is mechanically connected to the outer end of the torque tube 4 by any suitable means schematically indicated by the dash line 23. For the purpose of maintaining the stator member 21 at a reference or datum position, it is connected to the outer end of a rod 24, this connection being schematically indicated by the dash line 25. The rod 24 lies within the hollow torque tube 4, the inner end of the rod being connected to or forming a part of the central hub member 6. With this arrangement it will be clear that whenever forces transmitted by the torque tube 4 between the servomotor bell crank 5 and the elevator 1, the elastic deformation of the torque tube 4 will cause a corresponding relative rotation of the rotor and stator members of the electric signal generator 14, the magnitude and polarity of the output voltage of the signal generator being indicative of the amount and direction of the elastic deformation of twist of the torque tube 4.

The thickness and composition of the torque tubes 9 and 4 are selected such that the elastic deformations therein are suitable for operation of the signal generators 13 and 14. For proper operation, the torque tubes should be designed so that the elastic limit of the material is not exceeded under conditions of maximum stress encountered in operation.

In order that the output of the signal generators 13 and 14 may be utilized to control the direction of movement of the servomotor 3, they are effectively connected in opposing series circuit to a polarity or phase sensitive amplifier 26. The amplifier, which is energized from the common alternating supply lead 17, supplies a normally balanced direct current ouput to the servomotor 3 in a direction dependent upon the polarity of the amplifier input signal.

In order to adjust the boost amplification of the system, means are inserted for varying the relative outputs of signal generators 13 and 14 which are applied to amplifier 26. For this purpose, I have employed a voltage gradient adjusting potentiometer 27 having an arm 29. The potentiometer 27 is affixed by any suitable means to the frame of the aircraft or to any stationary member mounted thereon such as, for example, the casing of servo 3. The wiper arm 29 may be controlled by various means, as is more fully explained hereinafter, but is here shown as mounted on the output shaft of servo 3. Wiper arm 29 is movable in either direction along potentiometer 27 and in the diagram is illustrated in its normal position, i. e., the position it occupies when neither lever 2 nor servo 3 are displaced from their null positions. In fact, the entire power boost system is shown in the present normal position wherein the elevators are set to maintain the craft in level flight.

The potentiometer 27 together with a fixed resistor 28 is connected across the output of rotor winding 22 and thus, even though the arm 29 travels to the right end of potentiometer 27, as viewed in the diagram, the minimum fixed resistance 28 will always remain across the output of winding 22. Potentiometer 27 is, however, not a linear potentiometer. The potentiometer turns lying between the neutral position of arm 29 and the left end of the potentiometer are shorted out by shorting bar 30, whereby there is no voltage drop between the left end and the neutral position. Moreover, depending upon the output characteristics desired from the boost system, the turns between the neutral position and the right end of the potentiometer may be constructed so that the voltage drop varies across different equal length sections of the winding. In other words, the right half of the potentiometer may be wound in any linear or non-linear fashion as desired. In any case, from the manner in which the output of signal generator 14 is connected, it will be evident that by moving the arm 29 to the right from the neutral position, something less than the full voltage generated by generator 14 will be tapped off for transmission to the amplifier, or in other words, the amplifier will receive a relatively larger signal from the pilot signal generator 13 and therefore, greater force amplification will result. However, when arm 29 is moved to the left from the neutral position, the full voltage of generator 14 is picked off and supplied to amplifier 26 whereby the force amplification remains constant.

With the foregoing arrangement, it will be clear that the boost ratio may be made as high as desired so that the controls will operate easily at any airplane deflection angle. As pointed out earlier however, there is the disadvantage in that, with a high boost ratio, the airplane becomes unmanageable due to overcontrol about the null point. According to the present invention, I provide means for overcoming such disadvantages of prior systems by having the boost ratio vary as some function, such as control surface deflection, in order that an improved force vs. deflection characteristic may be obtained as the pilot control lever is moved over its entire range. For purposes of illustration I have shown the potentiometer arm 29 as being attached to the output connection of servomotor 3. However, the arm may be connected to some other point which moves with the load or to some control device responsive to a variable flight condition, for example, a rate of climb indicator. The operation should be made such that, as the control surface angle increases in either direction from its neutral position, the load selsyn voltage is attenuated thereby automatically increasing the boost ratio.

With the foregoing understanding of the elements and their organization, the operation of my power boost system will be readily understood from the following explanation. It will be assumed that initially, the signal generators 13 and 14 are in the zero voltage position and the potentiometer arm 29 is at the neutral position. For this condition, the voltage input to the amplifier 26 will be zero and the servomotor 3 will be stationary. It will also be assumed that the aircraft is not turning about the pitch axis and that the elevators 1 are in a neutral position. If the pilot desires to raise the elevators 1 so as to place the aircraft in a climb, he pushes on the top of the control lever 2 in a direction tending to rotate it to the right as viewed in Fig. 1. This action causes an elastic deformation of the torque tube 9 whereby the signal generator 13 produces a control voltage which is applied to the input of amplifier 26, resulting in a displacement of the servomotor 3 in a direction to aid the pilot in moving the lever 2. As a result of this action, the bell-crank 7 rotates to raise the elevators 1. Due to the action of the air stream on the elevators 1, they tend to resist movement away from the flight neutral position and when they are so moved by the action of the servomotor 3 and the control lever 2, there is a reactive force which causes an elastic deformation or twist of the torque tube 4 proportional to the force exerted on the elevators. This elastic deformation of the torque tube 4 causes actuation of the signal generator 14 which produces a control voltage in opposition to that produced by the signal generator 13. Depending upon the extent of servomotor movement however, the output of signal generator 14 is reduced by an amount depending upon the voltage reduction resulting from the actuation of the potentiometer arm 29 toward the right. When the elevators are raised to a point where the voltage produced by the signal generator 14 as modified by potentiometer 27, is equal and opposite to that produced by the signal generator 13, the input voltage to the amplifier 26 becomes zero and movement of the servomotor 3 ceases. In this manner, the force exerted on the elevators 1 is proportional to the force exerted by the pilot on the control lever 2 and it will be clear that by applying a varying force to the control lever 2 the pilot can cause a corresponding and proportional force to be applied to the elevators 1. Furthermore, due to the fact that the torque tubes 9 and 4 are connected in series relation, even though they are preferably remotely located in the airplane, there is a force feedback or "feel" on the control lever 2 which is directly proportional to the force required to displace the elevators from the flight neutral position.

If the pilot desires to restore the elevators to the neutral position, he simply releases the control lever 2. Due to its elasticity the torque tube 9 then returns to its initial position in which the voltage output of the signal generator 13 is zero. A signal voltage of reverse polarity is then applied to the input of the amplifier 26 by the signal generator 14 whereupon the servomotor 3 moves in the opposite direction, moving the elevators 1 toward the neutral position. When the elevators reach the neutral position there is no longer any reactive force exerted on the torque tube 4 which then, because of its elasticity, returns to its neutral unstressed position whereupon the voltage output of the signal generator 14 returns to zero and the servomotor stops.

From the foregoing it will be clear that when the pilot control lever is displaced in the opposite direction to the left, the reverse action takes place and the elevators 1 are depressed until the reactive force thereon is proportional to the force exerted on the control lever 2. Of course, since in the illustrated system the movement of arm 29 does not cause any voltage attenuation during a depressing of the elevators, the boost ratio therefore remains constant. This is ordinarily desired, however, since the resistances of both the craft and the pilot are lower to the forces caused by going into a dive, i. e., negative g's, than to forces caused by coming out of a dive or going into a climb, i. e., positive g's. As is well known in the art, by g's I mean the ratio of the acceleration forces on the craft and the pilot to the normal gravitational force of the earth. In this diving sequence as in the above described climbing sequence once the control lever is released, the servomotor 3 causes the elevators and the control lever 2 to be restored to the center neutral position.

Fig. 2 shows a "force vs. deflection" curve which may be obtained from the illustrated embodiment of my variable boost ratio principle. The abscissa is divided into g's, both positive and negative, while the force $f_s$ on the "stick" is shown as an ordinate. It will be noted that there are two dash lines $h$ and $l$ which may be considered as limits within which force amplification curves of conventional systems might fall. Such curves would normally be linear however and thus it will be seen that with a high boost ratio as shown by line $h$, the control system would be very sensitive and relatively critical about a zero $f_s$ point. If on the other hand, the boost ratio were decreased such as shown by line $l$, there would be inadequate boost for ease of operation at high g's. My invention overcomes these disadvantages by means which alter the boost ratio in response to a predetermined condition and thus provide a greatly improved operating result as shown in the solid curve. Thus, ease of operation is achieved at surface deflections without overcontrol about the null point. If will of course be obvious that the potentiometer 27 may be so tapered that any specific non-linear characteristic may be obtained as desired.

For the sake of clarity, I have illustrated my improved power boost system as applied to only one aircraft control surface, that is, the elevator surface. Obviously, this system may be equally well applied to control the rudder and ailerons of the aircraft. Moreover, I have shown my variable boost principle as employed only during displacements of the control surface on one side of its neutral position. It, of course, may be employed for control surface displacements on either side of the neutral position. For such an operation, however, a slightly different arrangement of potentiometer 27 is necessary. In this case, the potentiometer is provided with a midtap and no shorted turns whatsoever. The voltage from generator 14 is applied across the two halves of the potentiometer in parallel, one generator terminal being connected to the potentiometer midtap and the other terminal being connected to both ends of the potentiometer. The potentiometer output is taken between its ends and the wiper arm. With the system in its neutral position, the wiper arm lies in contact with the midtap, and thus upon a control surface displacement in either direction only a portion of the voltage from generator 14 is picked off, i. e., the portion appearing between the wiper arm and the nearest end of the potentiometer. This voltage attenuation for both directions of control surface displacement, of course, results in an increased boost ratio for both directions of displacement.

It will also be clear that the wiper arm 29 need not necessarily be attached to the servomotor at the specific point shown, it being clear that the wiper arm may be attached through a connecting link to the bell-crank 5 or 7 or to the elevators 1, the principle and purpose being in each case to vary the boost ratio of the system as a function of the movement of the connecting apparatus between the servo 3 and the elevators 1.

While a particular embodiment of my invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of my invention.

What I claim as new and desire to secure by Letters Patent of the United States is:

1. In a control system for actuating a controlled object by a control device with force amplification, first and second elastic linkages, a connection joining one end of each of said linkages to one end of the other, said control device being attached to the other end of said first linkage and said controlled object being attached for movement with said connection, a servomotor coupled to the other end of said second linkage for supplementing the control force applied by said control device, a first electric signal generator connected to respond to elastic deformation of said first linkage, a second electric signal generator connected to respond to elastic deformation of said second linkage, electro-responsive means responsive to the difference of the outputs of said generators for controlling said servomotor, and means actuated in accordance with movement of said servomotor for attenuating the output of one of said generators.

2. In a power boost system, first and second torque tubes each having one end interconnected, a rotatable control lever connected to the other end of said first tube, a rotatable controlled object connected to the junction of said torque tubes, and providing resistance against rotation in either direction from a neutral position, a reversible servomotor connected to the other end of said second tube to apply torque thereto, a first signal generator responsive to elastic deformation of said first torque tube for producing a first signal voltage variable in polarity and magnitude in accordance with the direction and amount of deformation, a second signal generator responsive to elastic deformation of said second torque tube for producing a second signal voltage variable in polarity and magnitude in accordance with the direction and amount of deformation, means responsive to movement of said second torque tube as a whole for modifying said second signal voltage, and electro-responsive means controlled jointly by said first signal voltage and the modified second signal voltage for controlling the direction and magnitude of movement of said servomotor.

3. In a control system for actuating a controlled object by a control device with force amplification, a pair of elastic linkages having a coupling therebetween, means connecting said coupling to said controlled object, one of said linkages being adapted for elastic deformation by said control device, a servomotor connected to the other of said linkages for supplementing the control force applied by said control device, a first electric signal generator connected to respond to elastic deformation of said one linkage, a second electric signal generator connected to respond to elastic deformation of said other linkage, means for varying the output voltage gradient of one of said generators to adjust the amplification factor, an electro-responsive device connected to be responsive to the differential output of said signal generators for controlling said servomotor, and means coupling said servomotor to the voltage gradient varying means for controlling the operation of said varying means in accordance with displacement of said servomotor from a null position whereby said amplification factor varies as a function of said displacement.

4. A control system for actuating a load in accordance with movement of a control device comprising, a servomotor, a first mechanical connection for transmitting operating force between said control device and said load, said connection being subject to elastic deformation when force is applied thereto, an electric generator actuated by said control device for producing a first reversible direction control voltage, a second mechanical connection for transmitting operating force between said servomotor and said load, said connection being subject to elastic deformation when force is applied thereto, an electric signal generator actuated in accordance with the elastic deformation of said mechanical connection for producing a second reversible direction control voltage, adjustable resistance means for modifying the output voltage gradient of one of said generators, means coupling said resistance means to said second mechanical connection whereby said means are adjusted by the overall movement of said second connection, and a direction-sensitive electro responsive device connected to be responsive to the algebraic summation of said first and second control voltages.

5. In a power boost system, a rotatable control lever, a rotatable controlled object providing resistance against rotation in either direction from a neutral position, a reversible servomotor, a first torque tube interconnecting said lever and said object, a separate second torque tube interconnecting said servomotor and said object, first and second signal generators each responsive to the elastic deformation of a separate one of said torque tubes for producing a signal voltage variable in polarity and magnitude in accordance with the direction and amount of said deformation, and an electro-responsive device controlled jointly by said first and second signal generators for controlling the direction and amount of movement of said servomotor.

6. A nonlinear responding control system for actuating a load comprising: a servomotor, an elastic linkage interconnecting said servomotor with said load to be actuated, a control device, means responsive to movement of said control device for producing a first signal, means responsive to deformation of said elastic linkage for producing a second control signal, a variable attenuator connected across the output of one of said signal producing means, means responsive to deformation of said elastic linkage for continuously actuating said attenuator to vary the output of one said signal producing means in accordance therewith, and means for energizing said motor in accordance with the algebraic sum of said varied and non-varied control signals.

7. In a system for actuating a controlled member by a control device with variable force amplification dependent upon the degree of actuation of said controlled member, an elastic linkage interconnecting said member with said control device, a servomotor, a second elastic linkage interconnecting said motor with said controlled member, means responsive to deflection of said elastic linkage for generating a first control signal, means responsive to deflection of said second elastic linkage for generating a second control signal, a variable voltage modifier for determining the sensitivity response of one of said control signal producing means to movement of its associated linkage, means responsive to movement of said controlled member for continuously actuating said voltage modifier, and adding means for energizing said motor in accordance with the algebraic sum of said sensitivity controlled signal producing means and said remaining signal producing means.

8. A control system for actuating a load in accordance with movement of a control device comprising: a servomotor, a first mechanical connection for transmitting operating force between said control device and said load, said connection being subject to elastic deformation when force is applied thereto, an electric generator actuated by said control device for producing a first control voltage, a second mechanical connection for transmitting operating force between said servomotor and said load, said connection being subject to elastic deformation when force is applied thereto, an electric generator actuated by said control device for producing a first control voltage, a second mechanical connection for transmitting operating force between said servomotor and said load, said connection being subject to elastic deformation when force is applied thereto, an electric signal generator actuated in accordance with the elastic deformation of said second mechanical connection for producing a second control voltage, adjustable attenuation means for modifying the output voltage gradient of one of said generators, means coupling said attenuating means to said second mechanical connection whereby said means are continuously adjusted by movement of said second connection, and an electro-responsive device responsive to said first and second control voltages for energizing said motor in accordance with the algebraic summation thereof.

9. In a power boost control system having a reversible servomotor, a control device and a controlled object, a first mechanical linkage interconnecting said control device and said controlled object, a second mechanical linkage interconnecting said controlled object and said servomotor, said first linkage being subject to elastic deformation when a force is applied to said control device and said second linkage being subject to elastic deformation when said servomotor applies a force to said controlled object, means for providing a first E. M. F. proportionally varying in magnitude and polarity in accordance with the amount and direction of elastic deformation in said first linkage, means for providing a second E. M. F. nonlinearly varying in magnitude and polarity with the amount and direction of elastic deformation in said second linkage, said latter means including a means for providing a E. M. F. porportionally varying in magnitude and polarity with the amount and direction of elastic deformation in said second linkage, and means controlled by the movement of said second linkage for additionally varying the magnitude of this proportional E. M. F., and means for controlling the direction of movement of said servomotor in accordance with the algebraic sum of the proportional E. M. F. and the nonlinear E. M. F.

10. In a power boost system a manually operated control device, a movable controlled member providing resistance against movement, a servomotor, a first elastic linkage directly interconnecting said control device and said controlled member, a second elastic linkage directly interconnecting said member with said servomotor, first and second electric signal generators connected respectively to respond to elastic deformation of said first and second linkages, and an electro-responsive device energized by said first and second signal generators for controlling said servomotor in accordance with the difference thereof.

11. In a control system for actuating a controlled object by a control device with force amplification, first and second elastic linkages, a connection joining one end of each of said linkages to one end of the other, said control device being attached to the other end of first linkage and said controlled object being attached for movement with said connection, a servomotor coupled to the other end of said second linkage for supplementing the control force applied by said control device, a first signal generator connected to proportionally respond to elastic deformation of said first linkage, a second electric signal generator connected to nonlinearly respond to elastic deformation of said second linkage, and electro- responsive means for controlling said servomotor in accordance with a difference of said proportional and nonlinear generator outputs.

References Cited in the file of this patent

UNITED STATES PATENTS

| Number | Name | Date |
|---|---|---|
| 2,137,974 | Fischel | Nov. 22, 1938 |
| 2,232,982 | Tank | Feb. 25, 1941 |
| 2,387,795 | Isserstedt | Oct. 30, 1945 |
| 2,411,139 | Roy et al. | Nov. 12, 1946 |
| 2,451,263 | Webb et al. | Oct. 12, 1948 |
| 2,452,311 | Markusen | Oct. 26, 1948 |
| 2,475,484 | De Nise | July 5, 1949 |
| 2,511,846 | Halpert | June 20, 1950 |
| 2,522,284 | Lecarme | Sept. 12, 1950 |